United States Patent [19]

Kestner et al.

[11] 4,287,236

[45] Sep. 1, 1981

[54] METHOD OF IMPROVING THE FREEZE RESISTANCE OF PARTICULATE MATERIAL AT LOW TEMPERATURES

[75] Inventors: Mark O. Kestner, Mendham; Stephen H. Stoldt, Dover, both of N.J.

[73] Assignee: Apollo Technologies, Inc., Whippany, N.J.

[21] Appl. No.: 65,612

[22] Filed: Aug. 10, 1979

[51] Int. Cl.$^3$ .............................................. C10L 9/00
[52] U.S. Cl. .......................................... 427/221; 44/6; 106/13; 252/17
[58] Field of Search ....................... 44/6, 1 R; 106/13; 252/70; 427/221

[56] References Cited

U.S. PATENT DOCUMENTS

| 4,117,214 | 9/1978 | Parks | 427/220 |
| 4,162,347 | 7/1979 | Montgomery | 106/13 |

FOREIGN PATENT DOCUMENTS

| 621408 | 6/1961 | Canada | 427/221 |
| 535588 | 3/1941 | United Kingdom | 427/21 |
| 874686 | 3/1959 | United Kingdom | 427/221 |
| 953778 | 8/1962 | United Kingdom | 44/6 |

*Primary Examiner*—Sam Silverberg
*Attorney, Agent, or Firm*—James & Franklin

[57] ABSTRACT

The resistance of particulate material to clumping or solidification at below-freezing temperatures is improved by applying to the particles a coating of a polymer emulsion in water which drys to a water-insoluble film. A freeze-point-depressing substance is preferably combined with the emulsion in order to prevent the emulsion itself from freezing at the temperatures to which the particulate material is subjected. It is believed that said coating minimizes the strength of adhesion between the particles and any ice which may form between them and also minimizes the strength of such ice.

30 Claims, No Drawings

METHOD OF IMPROVING THE FREEZE RESISTANCE OF PARTICULATE MATERIAL AT LOW TEMPERATURES

The present invention relates to a method of improving the handling capabilities of particulate material and particularly the tendency of such materials to clump or form solidified large masses under below-freezing temperature conditions, especially when that particulate material is moist or wet.

Solid materials to be handled in large quantities are commonly stored, handled, and transported under conditions where they are exposed to the atmosphere. Examples include: conveyance of materials from a mine-mouth to initial storage near the mine, such as on conveyor belts; storage of these materials near the mine; loading of these solid materials, such as into ships or railcars; transport of these solid materials in open-top conveyances such as railroad hopper cars; transfer from one means of conveyance to another; unloading of these solid materials at their destinations; storage of these solid materials at or near the site of their intended use; and conveyance of these solid materials from this storage to their intended use.

During any of these operations, these solid materials often become contaminated with water, by precipitation (e.g., rain, snow, sleet), by condensation (e.g., dew), or by evaporation of moisture from warmer areas of the pile and condensation in cooler areas such as those near the ground and those near any metal or other heat-conducting material. When the ambient temperature drops sufficiently to cool the moisture below its freezing point, the ice that is formed can bond the solid particles to one another. This can provide a rigid network of particles cemented together by the ice, which network then makes handling and transportation of the solids, by the means normally used for those operations, difficult or impracticable.

The economic consequences of these impairments to operations are numerous. Some examples include immobilization of transporting conveyances (e.g., railcars) because of unloading difficulties, need for increased manpower to perform an operation, operation of processes at reduced throughout because of insufficient solid fuel and/or raw materials, and in the extreme an actual shutdown of an operation.

Various methods have been tried in order to circumvent these problems, with varying degrees of limited success. These include: treating the solids with an oil to prevent penetration of water and/or to coat the particles and prevent adhesion thereto to water and ice; use of warm sheds in which to unload railcars that contain frozen solids; adding chemicals to depress the freezing point of the water; adding chemicals to absorb the moisture; and drying a sizeable portion of the solid and then mixing same with the undried solids.

Experimental results using some of these methods have been compared (R. C. Ellman, J. W. Belter, and L. Dockter, "Freezeproofing Lignite", Report of Investigations 6677, U.S. Dept. of the Interior, Bureau of Mines, 1965). The last of the above techniques proved more effective and economical than did use of either freezing point depressants or moisture absorbers.

Physical laws define economic limitations to the use of these latter two methods. For instance, the freezing point depression constant of water is 1.86 degrees C. per gram molecular weight of solute per kilogram of solvent. Consider ethylene glycol, a commonly used freezing point depressant with a molecular weight of 62 grams per gram-mole, applied to a solid (such as coal) that contains as little as 5% moisture. It would require 5.9 pints of ethylene glycol per metric ton of this coal (5.35 pints/ton) to reduce the freezing point of the water only 1.86 degrees C. (3.35 degrees F). Since ambient temperatures in many areas can reach below 0° F., at least ten times this treatment rate could be required to prevent freezing of the water. Such treatments are clearly uneconomical and wasteful.

The literature also indicates (Ellman, above cited) that attempts to freezeproof a lignite, using either ethylene glycol or salts, were unsuccessful. These tests measured the rupture strengths of samples of frozen lignite, after treatment with various additives. Attempts to reduce rupture strength by absorbing water with salts were effective only at high treatments, 8% by weight. At treatment rates that were closer to being economical, such as 15 pounds of rock salt per ton of coal (0.78%), no reductions in rupture strength of the frozen lignite samples were observed.

Parks et al. U.S. Pat. No. 4,117,214 of Sept. 26, 1978, entitled "Method and Composition for Reducing the Strength of Ice" describes a modification of the ethylene glycol approach to the problem which involves adding to the ethylene glycol a water-soluble organic non-volatile compound, the said compound enhancing the ice strength reduction that is achieved.

The rationale behind all these tests is that if one can reduce the rupture strength of ice that is cementing the particles of a solid, then the solid will be more easily handled, and storage and transportation operations will require less time, equipment, energy, manpower, and cost. Thus, it is not really necessary either to reduce significantly the freezing point of the water or to absorb any sizeable fraction of it. It would be sufficient for the above purposes if the ice could simply be weakened, so that it would fracture and allow flow of the solids under less applied pressure and in some cases, such as unloading of railroad cars, simply under the weight of the solids themselves.

A major problem involved in the use of water-soluble compounds for any of the purposes in question is that they are in many instances unreliable for the very reason that they are water-soluble. If, for example, coal particles are treated with such materials the desired effect will be produced only for so long as the materials remain on the coal particles. However, if a pile of treated coal is rained on after having been treated with the materials, those materials, being water-soluble, will tend to dissolve into or otherwise carried off by the rain water. If thereafter the pile of coal is subjected to below-freezing temperatures the substances previously applied will be either totally or partially ineffective to perform their desired function. In an attempt to compensate for this leaching-out effect, it is necessary, therefore, to apply to the coal what would normally be considered an excess of the operative materials, thus considerably increasing the cost of treatment, and still without any assurance that enough of the operative materials will remain on the particles after the rainfall to do a proper job.

We have found that the strength of ice bonds between particles when subjected to below-freezing temperatures can be reduced to at least the same degree as is accomplished by prior art procedures, but without being subject to leaching-out by rain or the like, by treating the particles with certain water-insoluble substances, as a result of which the operative substances when once applied to the particles tend to remain in place despite being subjected to rain or other leading influences. More specifically, a coating of a polymer emulsion in water is applied to the particles, that emulsion having the characteristic of drying to form a water-insoluble film. The reason why such a coating enables piles of wet particulate material to resist the usual effects of below-freezing temperatures is not known for certain, but the effect does come about. It is believed that the emulsion forms a coating on the particles which substantially reduces the strength of the bond between those particles and any ice that may form between them.

The polymer emulsion has a water base itself subject to freezing, and consequently it is generally desirable to add to the emulsion of water-soluble freeze-point-depressant which is compatible with the emulsion, (i.e., will mix with it over a wide range of relative proportions without coagulation or setting), in an amount sufficient to render the emulsion non-freezable at the ambient temperatures to which the pile of particulate material is expected to be subjected. Among the many freeze-point-depressive substances which can be employed are those glycols previously known to have that characteristic, such as ethylene, propylene and dipropylene glycols singly and in combination.

These glycols, being water soluble, appear to be taken up into the ice-forming water between particles, thus contributing to some extent to the lessening of the strength of the ice that is formed, as is taught in the prior art, but because the glycols are initially in the latex they are not washed away by rain or the like.

The polymer emulsion is preferably of a low viscosity, so that it can be applied to the particulate material in the form of a spray and, when thus applied, will coat the particles in a generally uniform manner.

It is therefore the object of the present invention to devise a method for treating particulate material so that its particulate nature will not be materially adversely affected when the particles are wet and are subjected to below-freezing temperatures, and in particular to provide such a method which will be relatively unaffected by subsequent subjection of the particles to rain or other conditions of water application, which rain in the past has tended to wash away the prior art treating materials and leave the particles once again subject to the deleterious action of low temperatures.

To the accomplishment of the above, and to such other objects as may hereinafter appear, the present invention relates to a method of improving the freeze-resistance of particulate material, as defined in the appended claims and as described in this specification.

In order to evaluate the effect of the various substances on the strength and effectiveness of ice bonds between wetted particles at below freezing temperatures, tests were carried out by means of specially designed apparatus which consists of a stainless steel rod of round cross-section with a flat tip of known surface area, ground to a high polish and at right angles to the long axis of the rod. This tip is used to contact a frozen sample. A platform is attached to the other (upper) end of the rod, and the rod is held vertically in a sleeve with a setscrew so that it can be applied to a frozen sample. Weights are added stepwise to the platform after the tip of the rod is placed against the frozen sample, and the weight required to fracture the sample is taken as the crush strength of that particular sample.

In actual practice, several rods, with tips of different diameters, were used. When measuring the crush strengths of samples of ice which had been treated with various chemicals, a tip of 64.7 mils (1.65 mm) diameter was used, so as to apply the force to a small area (2.12 mm$^2$) and thus produce pressures of several thousand pounds per square inch. When frozen coal samples were studied, a tip of 310.1 mils (7.876 mm) diameter was used, so as to apply the same force to a larger area (48.72 mm$^2$) and give pressures in the range of several hundred pounds per square inch.

Using the first method, crush strengths of standard ice samples were measured. The samples were prepaed by pipetting 1.00 ml. of water or aqueous solution into a plastic ice tray with rectangular compartments ¾ inch by ⅝ inch, covering with paraffin-treated wrap, and freezing at 0° F. Samples were removed while still in the freezer, transferred to a fusion tin in a pour point determination tube (all materials precooled), and placed in the sample compartment of a pour point bath held at 0 degrees F. After temperature equilibration, the rod was applied to the center of the sample and weights were added, in increments of 50 grams or less, until the sample fractured.

It was found that ice made from dilute solutions of various salts had crush strengths no different from that of ice made deionized water.

It was also found that various water-soluble organic compounds could slightly reduce the crush strength of ice when added to the water. Within the limits of repeatability, ethylene glycol and propylene glycol gave approximately equal reductions in ice strength, and higher molecular weight glycols (diethylene glycol, dipropylene glycol, and polymeric glycols made from ethylene oxide) had less or no effect. Moreover, mixtures of ethylene glycol and propylene glycol gave no apparent benefits over an equal concentration of either glycol by itself.

These studies were carried out at 2–5% by weight concentrations of the glycols in water. For a solid that is wet with 5% water, these would correspond to 2–5 pounds of glycol per ton of solid, which approaches economic treatment rates more closely than do the examples from the literature described above. However, the reductions in crush strength of the ice were still slight.

The basic substance involved in the present invention is a latex, i.e., an aqueous emulsion or dispersion of polymer. The polymer latices selected were those which dried to form an essentially insoluble latex coating on the surface of the particles. Sufficient water was used in or with the latex so that the latex had a relatively low viscosity to enable it to be readily sprayed onto the particulate material. There appears to be nothing critical about the chemical composition of the polymer involved. All that is required, to accomplish the results in question, is that the polymer be insoluble in water, that it be present in the form of an emulsion or dispersion in water, and that the coating should dry to form a generally water-insoluble film. Polymers which have given effective results when used in the form described are vinyl chloride, acrylic, acrylonitrile and vinyl acetate polymers, as well as vinyl-acrylic, styrene-acrylic, styrene-butadiene, styrene-vinyl-acrylic and vinyl acetate-dibutylmaleate copolymers.

The amount of latex solids present in the emulsion can vary widely and is dictated primarily by economics. In general polymer solids should be present in an amount by weight of 3.5–25% of the total treatment mixture with a range of 3.5–10% being preferred. Tests indicated that in general using less than 3.5% polymer solids gave only minimal beneficial results, and using more than 25% polymer solids gave little or no increased beneficial effect, so that the use of additional polymer solids became economically unjustifiable.

Treatment rates of the emulsion will also vary widely, depending upon the specific particles involved and the ambient conditions to which those particles are expected to be subjected. In general, the finer particles the greater the total surface area, and hence the more emulsion is required. In general, the more absorbent the particles the more emulsion is required in order to form the desired coating on the particles. Treatment rates between 2.5 pints per ton of particulate material and 5.0 pints per ton of particulate material have been employed with good effect, but lesser or greater treatment rates may be required in particular circumstances. About 2.0 pints per ton of particulate material appears to represent a commercially practical lower limit for particulate coal particles, but it will be understood that the treatment rate is essentially empirical.

While the process of the present invention is believed to be applicable to any particulate mass, its use in connection with coal, coke, limestone, gravel and iron ore is believed to be particularly efficacious.

Since the emulsion, after being applied to the particles, will be subjected to the same below-freezing temperature as the particles themselves, and because the emulsion has a substantial water content, the emulsion itself is subject to freezing, and freezing of the emulsion would be detrimental to the achievement of the desired objects. For that reason an emulsion-compatible freeze-point-depressant which is non-volatile and water soluble is generally added to the latex. The chemical nature of that freeze-point depressant is not critical provided that it has the stated characteristics. Glycols and glycol ethers and esters are among the applicable freeze-point-depressant compositions, and in particular ethylene, propylene and dipropylene glycols used singly or in combination. In some tests the use of dipropylene glycol alone has been found to present certain problems of compatibility and high-temperature storage, for reasons not understood, and it may be that these tests results were abberational. In many tests a combination of ethylene and propylene glycol has been found to be particularly efficacious. The amount of freeze-point-depressants added to the emulsion will vary depending upon the operative effect of the particular substance used and the degree to which freeze-point-depression of the emulsion is desired. For most applications the freeze-point-depressant may be added in proportions between 30% and 95% by weight, and preferably between 60% and 70% by weight when the previously set forth glycols have been employed.

The latex may be applied to the particles in any desired fashion, but spraying the latex onto the particles, for example, as the particles move along a conveyor path to the location where they are to be stored or piled, is particularly well adapted to industrial use. Accordingly, the water content of the applied material is sufficiently great for the viscosity of that material to be low enough to permit the material to be readily sprayed.

The result of the treatment here described is to provide on the particles a surface barrier layer which prevents or inhibits the adhering of ice to the particle surfaces. In other words, the coating is such that the bond which ice forms to that coating is considerably weaker than the bond which ice would form with respect to the uncoated particle surfaces. The fact that the polymer and the coating or film which it forms are water-insoluble serves to inhibit the washing away of the treatment material when the particles are subjected to water flow such as may be produced by rain, water sprays or the like. Hence once the material is applied to the particles it will tend to remain in place even if the particle pile is heavily rained on, and hence will provide effective protection against freezing in a reliable and more or less permanent fashion.

In one test, the results of which are summarized in Table I, treatment rates of 2.0 pints per ton resulted in significant reductions in the crush strength of coal subjected to a temperature of $-5°$ F. In those tests Curasol AK Latex was a homopolymer of polyvinyl acetate in an aqueous emulsion commercially available in a 50% solids form, Acrylic DLR Latex was a polyacrylate in aqueous emulsion commercially available in a 50% solids form, and the glycols used comprised propylene glycol and dipropylene glycol mixed in equal amounts.

TABLE I

| Additive Formula | Crush Strength 4–30 Mesh Coal at 10% $H_2O$ and $-5°$ F. (psi) |
|---|---|
| 1. None | 228.2 |
| 2. Curasol AK Latex (3.5% solids) Glycols (63%) Water (33%) | 149.7 |
| 3. Acrylic DLR Latex (3.5% solids) Glycols (63%) Water (33.5) | 150.2 |

Further tests were carried out with a number of different polymer latices, the results of which are set forth in Table II. In all of these tests the latices were approximately 50% solids, they were present in the treatment material in an amount of 7% by weight, thus producing in that material a solids content of 3.5% by weight, and mixed with the latices was a freeze-point-depressant in the amount of 63% by weight, that depressant consisting of an equal mixture of propylene glycol and dipropylene glycol. As will be seen from the results, all of the latices tested were found to be effective compared to an untreated control. At 2.5 pints per ton reductions in compressive strength ranged from 69.9% to 54.8% while at 5.0 pints per ton the percentage reductions varied from 81.8% to 56.3%. Compressive strength test results were found to be within about 8% on triplicate samples.

TABLE II

| Additive | Latex Type | Compressive Strength (psi) | |
|---|---|---|---|
| | | 2.5 pints/ton | 5.0 pints/ton |
| None (Control) | — | 204.4 (±36.7) | 204.4 (±36.7) |
| UCAR 366 | Vinyl-Acrylic Polymer | 81.5 (±8.4) | 82.2 (±6.8) |
| Geon 576 | Vinyl Chloride Polymer | 78.0 (±7.9) | 50.0 (±5.1) |
| Goodrite | Styrene-Buta- | 85.3 (±11.9) | 67.1 (±21.6) |

TABLE II-continued

| Additive | Latex Type | Compressive Strength (psi) 2.5 pints/ton | 5.0 pints/ton |
|---|---|---|---|
| 2570 | diene Copolymer | | |
| UCAR 503 | Styrene-Vinyl-Acrylic Copolymer | 61.4 (±11.9) | 50.3 (±8.3) |
| UCAR 515 | Styrene-Vinyl-Acrylic Copolymer | 61.4 (±3.6) | 54.1 (±13.6) |
| UCAR 872 | Acrylic Polymer | 82.2 (±3.7) | 37.2 (±11.8) |
| UCAR 879 | Acrylic Polymer | 92.0 (±21.5) | 65.5 (±0.4) |
| UCAR 4426 | Styrene-Acrylic Copolymer | 92.4 (±31.4) | 39.7 (±5.1) |
| Mowiton M300 | Vinyl Acetate | 75.4 (±2.0) | 57.0 (±0.8) |
| Mowiton M370 | Acrylic Polymer | 72.1 (±1.8) | 66.2 (±8.4) |
| Curasol AK | Vinyl Acetate Polymer | 74.9 (±1.8) | 50.8 (±3.7) |

(−4 to +30 Mesh Pennsylvania subbituminous coal at 10% H$_2$O and 5° F.)

Rain resistance tests demonstrated that a vinyl acetate latex (Curasol AK) formulation resisted dilution by an aqueous spray better than prior art water-soluble formulations. Furthermore, rain resistance is related to the concentration of latex. Experiments demonstrate, as shown in Table III, that all the latex formulations resisted dilution better than a glycol based formulation (IM-3S) which contained no latex and consisted of:

| 1. 50/50 - propylene glycol and dipropylene glycol | = 85% by wt. |
|---|---|
| 2. Water | = 10% by wt. |
| 3. Sodium Formate | = 5% by wt. |

It is evident from the data in Table III that all latices tested showed less residual surface moisture on the coal (i.e. repelled water better) than either an untreated control or a coal treated with IM-3S which retained all of the simulated rainfall. Likewise, all but two latex formulations showed higher water drainage rates from sprayed coal piles. These two latices, UCAR 879 and Geon 576, did, however, show lower compressive strength and less residual water than either control (None and IM-3S).

TABLE III

| Additive | Compressive Strength at 5.0 p/t Before Rain[1] | After Rain | Percent[2,3] Drainage | Residual % Surface Moisture |
|---|---|---|---|---|
| None (Control) | 204 | 642 | 0.0 | 27.8 |
| IM-3S (Control) | 54 | 429 | 0.0 | 31.3 |
| UCAR 366 | 82 | 319 | 17.5 | 20.5 |
| Geon 576 | 50 | 416 | 0.0 | 19.8 |
| Goodrite 2570 | 67 | 356 | 11.3 | 19.8 |
| UCAR 503 | 50 | 313 | 22.3 | 16.6 |
| UCAR 515 | 54 | 370 | 6.3 | 20.7 |
| UCAR 872 | 37 | 298 | 17.6 | 21.4 |
| UCAR 879 | 65 | 319 | 0.0 | 21.8 |
| UCAR 4426 | 40 | 303 | 25.8 | 18.8 |
| Mowiton M370 | 66 | 343 | 14.2 | 17.5 |
| Curasol AK | 51 | 313 | 10.2 | 17.9 |

[1] 10% surface moisture

[2] % Drainage = $\frac{\text{wt. water drained from coal}}{\text{wt. water sprayed from coal}}$

[3] Amount of water sprayed onto the coal pile was equal to about 20% of the weight of the sample.

As has been indicated, the IM-3S formulation used in one of the tests in Table III represents a solution of glycol freeze-point-depressant and a water soluble organic substance. The addition of such water-soluble organic substances to the treatment materials here under discussion is not necessarily ruled out, but it has been found that in most instances such water-soluble substances are not compatible with the latices which form the basis of the instant invention. For example, the addition of a 5% solution of sodium formate to the various latices specified in Table III showed lack of compatibility—settling or coagulation—with all of the latices except UCAR 872 and USAR 879, both acrylic polymer, but although Mowiton M370 is also an acrylic polymer, the sodium formate was not compatible with it. Here again the situation appears to be one of individual peculiarity of reaction.

To simulate application of the materials to coal on a conveyor belt, mixtures were prepared in Zip-lock bags to achieve uniform distribution. Each bag contained 180.0 g of 4–30 mesh coal, 18.0 g (10%) of water, and the treatment indicated:

| Sample 1. | 0.5 g IM-3S + 0.5 g Curasol AK (Vinyl acetate emulsion, 50% solids) | (1:1) |
|---|---|---|
| Sample 2. | 4.0 g IM-3S + 0.5 g Curasol AK | (8:1) |
| Sample 3. | No treatment | |
| Sample 4. | 0.5 g IM-3S + 0.0625 g Curasol AK | (8:1) |
| Sample 5. | 0.5 g IM-3S | |
| Sample 6. | 4.0 g IM-3S | |

(IM-3S is the same IM-3S sodium formate-water glycol formulation identified above.)

The samples were then formed into simulated coal piles. Each sample were weighed (175.0 g) into a 7.5 cm. I.D. Buchner funnel (containing 7 cm. diameter Whatman No. 52 filter paper) and shaped into a cone by means of an inverted powder funnel. The test specimens were dried overnight, then "rained on" by being exposed to a fine spray of deionized water from a spray bottle. Each sample was reconstituted (i.e., brought back up to its as-formed weight), then 10% more water (equivalent to about a 0.15-inch rainfall) was sprayed on. The eluents were collected in tared test tubes. The specimens were covered to minimize moisture loss and allowed to drain overnight. After weighing, each coal sample was then transferred to a Zip-lock bag, mixed well, and formed into pellets for frozen coal crush tests, the procedure for which has already been described in the August 3, 1978 Invention Record referred to earlier.

In addition, samples were taken of the coals (Nos. 5 & 6) which had been treated with IM-3S but which were not used for the cones. These were also subjected to the frozen coal crush tests, in order to be able to estimate the extents to which IM-3S was retained in the cone rain tests.

The following results were observed: In the cone rain tests, water began to be shed from Sample No. 1 even before it had been brought back to its original 175.0 g weight. This behavior had not previously been observed, even in those tests in which the same weight of the Curasol AK had been sprayed onto the surface of an already-formed coal pile.

Samples 2, 3, and 4 also shed some water, although not as much, while Samples 5 and 6 did not. It appears from these data that IM-3S, the non-latex formulation, attracts moisture into the coal pile (and eventually is washed out by it), while the latex formulations of the present invention repel the moisture and are not washed out by it.

Table IV indicates the quantities of water evaporated from, sprayed upon and eluted (shed) from the coal piles, the concentrations of water remaining on the coal, and the crush strengths (means of three determinations) of the frozen coals prepared from these coal piles.

TABLE IV

| Sample No. | Evaporative Loss, g. | Water Applied, g.$^a$ | Water Eluted, g. | Concentration of Water on Coal, % | Frozen Coal Crush Strength, psi |
|---|---|---|---|---|---|
| 1 | 10.3 | 16.7 | 14.3 | 2.95 | Too dry to form a frozen tablet |
| 2 | 6.3 | 16.0 | 1.87 | 12.2 | 25.9 |
| 3 | 10.4 | 16.0 | 1.71 | 8.87 | 291.2 |
| 4 | 9.4 | 16.9 | 4.34 | 9.31 | 57.5 |
| 5 | 9.3 | 16.9 | zero | 17.1 | 233.7 |
| 6 | 8.0 | 21.3 | zero | 24.2 | 98.4 |
| 5U$^b$ | N/A | N/A | N/A | 10.0 | 64.0 |
| 6U$^b$ | N/Z | N/A | N/A | 10.0 | Frozen tablet was too brittle to handle |

$^a$After making up for evaporative losses.
$^b$U = Untreated, i.e., not subjected to cone rain tests.
$^c$At −5°; mean of three determinations.

Consider these series 3-5U-5-4-1. Going from untreated coal to coal treated with non-latex IM-3S reduced crush strength from 291.2 to 64.0 psi. Raining on the treated sample washed out most of the IM-3S, as well as raising the water content of the coal, and increased crush strength to 233.7 psi, almost as high as untreated. However, when the Curasol AK latex was present at only ⅛ the same concentration of the non-latex IM-3S, the crush strength remained as low as, or even slightly lower than, the treated sample which had not been rained on, both because water was shed more readily and less treatment material was washed out. When the Curasol AK latex was present at the same concentration of the IM-3S, enough water was shed that a block of frozen coal could not even form.

Thus, the small fraction of the latex in the 8:1 formulation totally overcame the detrimental effects of rainfall on the freeze-conditioning of coal.

It will be appreciated from the above that by following the procedure here described the effect of below-freezing temperatures in preventing the caking of masses of wet or moist particulate material is greatly enhanced over the prior art, particularly with regard to insensitivity to the leaching effect of rain or the like on the treated particulate pile.

While only a limited number of embodiments of the present invention have been here specifically disclosed, it will be apparent that many variations may be made therein, all within the scope of the invention defined in the following claims.

We claim:

1. A method of improving the flow of particulate material at low temperatures by inhibiting clumping or solidification of large masses of said particles which comprises applying to the particles a coating of a polymer emulsion in water which has the characteristic of drying to form a water-insoluble film, exposing the particles en masse to external watering conditions and to temperatures below the freezing point of water, and then subjecting the particles at low temperatures to an operation in which they are caused to flow from one point to another under conditions such that clumping or solidification of large masses of said particles are deleterious, said coating being applied at the rate of between 2.0–5.0 pints of treatment material per ton of particulate material, the treatment material comprising polymer solids in an amount between 3.5–25% by weight of said treatment material.

2. The method of claim 1 in which said polymer is selected from the group consisting of vinyl-acrylic, acrylonitrile, vinyl chloride, styrene-butadiene, styrene-vinyl-acrylic, acrylic, styrene-acrylic, vinyl acetate-dibutylmaleate, and vinyl acetate polymers and copolymers.

3. The method of claim 1, in which said emulsion has a low viscosity and is applied to said particulate material in the form of a spray.

4. The method of claim 1, in which there is mixed with the emulsion an operative amount of a water-soluble, non-volatile, freeze-point-depressing substance compatible with said polymer emulsion.

5. The method of claim 4, in which said emulsion has a low viscosity and is applied to said particulate material in the form of a spray.

6. The method of claim 5, in which said mixture of emulsion and freeze-point-depressing substance comprises:
   polymer solids—3.5–25%
   freeze-point-depressant—30–95%
   water—remainder.

7. The method of claim 5, in which said mixture of emulsion and freeze-point-depressing substance comprises:
   polymer solids—3.5–10%
   freeze-point-depressant—60–70%
   water—remainder.

8. The method of claim 4, in which said mixture of emulsion and freeze-point-depressing substance comprises:
   polymer solids—3.5–25%
   freeze-point-depressant—30–95%
   water—remainder.

9. The method of claim 4, in which said mixture of emulsion and freeze-point-depressing substance comprises:
   polymer solids—3.5–10%
   freeze-point-depressant—60–70%
   water—remainder.

10. The method of claim 4, in which said freeze-point-depressing substance comprises a mixture of propylene glycol and dipropylene glycol.

11. The method of claim 10, in which said emulsion has a low viscosity and is applied to said particulate material in the form of a spray.

12. The method of claim 11, in which said mixture of emulsion and freeze-point-depressing substance comprises:
  polymer solids—3.5-25%
  freeze-point-depressant—30-95%
  water—remainder.

13. The method of claim 11, in which said mixture of emulsion and freeze-point-depressing substance comprises:
  polymer solids—3.5-10%
  freeze-point-depressant—60-70%
  water—remainder.

14. The method of claim 4, in which said coating is applied at the rate of about 2.5 pints or more per ton of particles.

15. The method of claim 14, in which said emulsion has a low viscosity and is applied to said particulate material in the form of a spray.

16. The method of claim 15, in which said mixture of emulsion and freeze-point-depressing substance comprises:
  polymer solids—3.5-25%
  freeze-point-depressant—30-95%
  water—remainder.

17. The method of claim 15, in which said mixture of emulsion and freeze-point-depressing substance comprises:
  polymer solids—3.5-10%
  freeze-point-depressant—60-70%
  water—remainder.

18. The method of claim 14, in which said mixture of emulsion and freeze-point-depressing substance comprises:
  polymer solids—3.5-25%
  freeze-point-depressant—30-95%
  water—remainder.

19. The method of claim 14, in which said mixture of emulsion and freeze-point-depressing substance comprises:
  polymer solids—3.5-10%
  freeze-point-depressant—60-70%
  water—remainder.

20. The method of claim 14, in which said freeze-point-depressing substance comprises a mixture of propylene glycol and dipropylene glycol.

21. The method of claim 20, in which said emulsion has a low viscosity and is applied to said particulate material in the form of a spray.

22. The method of claim 21, in which said mixture of emulsion and freeze-point-depressing substance comprises:
  polymer solids—3.5-25%
  freeze-point-depressant—30-95%
  water—remainder.

23. The method of claim 21, in which said mixture of emulsion and freeze-point-depressing substance comprises:
  polymer solids—3.5-10%
  freeze-point-depressant—60-70%
  water—remainder.

24. The method of claim 20, in which said mixture of emulsion and freeze-point-depressing substance comprises:
  polymer solids—3.5-25%
  freeze-point-depressant—30-95%
  water—remainder.

25. The method of claim 20, in which said mixture of emulsion and freeze-point-depressing substance comprises:
  polymer solids—3.5-10%
  freeze-point-depressant—60-70%
  water—remainder.

26. The method of claim 4 in which said polymer is selected from the group consisting of vinyl-acrylic, acrylonitrile, vinyl chloride, styrene-butadiene, styrene-vinyl-acrylic, acrylic, styrene-acrylic, vinyl acetate-dibutylmaleate, and vinyl acetate polymers and copolymers.

27. The method of claim 26, in which said emulsion has a low viscosity and is applied to said particulate material in the form of a spray.

28. The method of claim 27, in which said mixture of emulsion and freeze-point-depressing substance comprises:
  polymer solids—3.5-25%
  freeze-point-depressant—30-95%
  water—remainder.

29. The method of claim 27, in which said mixture of emulsion and freeze-point-depressing substance comprises:
  polymer solids—3.5-10%
  freeze-point-depressant—60-70%
  water—remainder.

30. The method of claim 28, in which said freeze-point-depressing substance comprises a mixture of propylene glycol and dipropylene glycol.

* * * * *

Disclaimer 4,287,236.—*Mark O. Kestner*, Mendham; and *Stephen H. Stoldt*, Dover, N.J. METHOD OF IMPROVING THE FREEZE RESISTANCE OF PARTICULATE MATERIAL AT LOW TEMPERATURES. Patent dated Sept. 1, 1981. Disclaimer filed Mar. 10, 1983, by the assignee, *Economics Laboratory, Inc.*

Hereby enters this disclaimer to all claims of said patent.
[*Official Gazette May 10, 1983.*]